No. 755,598. PATENTED MAR. 22, 1904.
A. SAVELSBERG.
PROCESS OF DESULFURIZING LEAD ORES.
APPLICATION FILED DEC. 18, 1903.
NO MODEL.
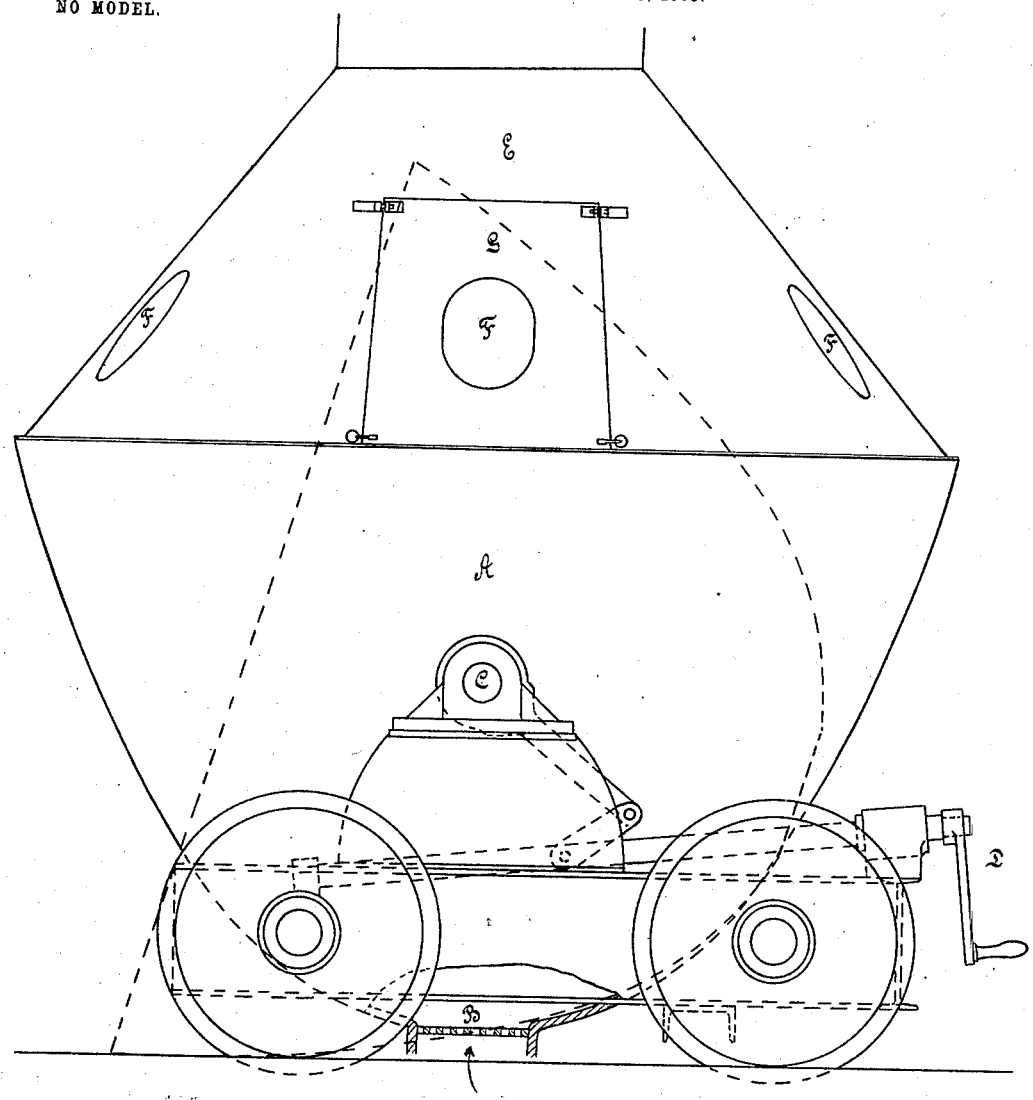

No. 755,598. Patented March 22, 1904.

UNITED STATES PATENT OFFICE.

ADOLF SAVELSBERG, OF RAMSBECK, GERMANY.

PROCESS OF DESULFURIZING LEAD ORES.

SPECIFICATION forming part of Letters Patent No. 755,598, dated March 22, 1904.

Application filed December 18, 1903. Serial No. 185,743. (No specimens.)

*To all whom it may concern:*

Be it known that I, ADOLF SAVELSBERG, a subject of the German Emperor, and a resident of Ramsbeck, Westphalia, Germany, have invented certain new and useful Improvements in Desulfurizing Lead Ores, of which the following is a specification.

The desulfurizing of certain ores has been effected by blowing air through the ore in a chamber, with the object of doing away with the imperfect and costly process of roasting in ordinary roasting-furnaces; but hitherto it has not been possible to satisfactorily desulfurize lead ores in this manner, as if air be blown through raw lead ores in accordance with either of the processes used for treating copper ores, for example, the temperature rises so rapidly that the unroasted lead ore melts and the air can no longer act properly upon it, because by reason of this melting the surface of the ores is considerably decreased, the greater number of points or extent of surface which the raw ore originally presented to the action of the oxygen of the air blown through being lost, and, moreover, the further blowing of air through the molten mass of ore produces metallic lead and a plumbiferous slag (in which the lead oxid combines with the gangue) and also a large amount of light dust, consisting mainly of sublimated lead sulfid. Huntington and Heberlein have proposed to overcome these objections by adopting a middle course, consisting in roasting the ores with the addition of limestone for overcoming the ready fusibility of the ores and then subjecting them to the action of the current of air in the chamber; but this process is not satisfactory, because it still requires the costly previous roasting operation in a roasting-furnace.

My invention is based on the observation which I have made that if the lead ores to be desulfurized contain a sufficient quantity of limestone it is possible by observing certain precautions, hereinafter set forth, to entirely dispense with the previous roasting in a roasting-furnace, hitherto necessary, and to desulfurize the ores in one operation by blowing air through them.

I have found that the addition of limestone renders the roasting of the lead ore unnecessary, because the limestone produces the following effects:

The particles of limestone act mechanically by separating the particles of lead ore from each other in such a way that premature agglomeration is prevented and the whole mass is loosened and rendered accessible to air, and, moreover, the limestone moderates the high reaction temperature resulting from the burning of the sulfur, so that the liquefaction of the galena, the sublimation of lead sulfid, and the separation of metallic lead are avoided. The moderation of the temperature of reaction is caused by the decomposition of the limestone into caustic lime and carbon dioxid, whereby a large amount of heat becomes latent. Further, the decomposition of the limestone causes chemical reactions, lime being formed, which at the moment of its formation is partly converted into sulfate of lime at the expense of the sulfur contained in the ore, and this sulfate of lime when the scorification takes place is transformed into calcium silicate by the silicic acid, the sulfuric acid produced thereby escaping. The limestone also largely contributes to the desulfurization of the ore, as it causes the production of sulfuric acid at the expense of the sulfur of the ore, which sulfuric acid is a powerful oxidizing agent. If, therefore, a mixture of raw lead ore and limestone (which mixture must of course contain a sufficient amount of silicic acid for forming silicates) be introduced into a chamber and a current of air be blown through the mixture and at the same time the part of the mixture which is near the blast-inlet be ignited, the combustion of the sulfur will give rise to very energetic reactions and sulfurous acid, sulfuric acid, lead oxid, sulfates, and silicates are produced. The sulfurous acid and the carbon dioxid escape, while the sulfuric acid and sulfates act in their turn as oxidizing agents on the undecomposed galena. Part of the sulfates is decomposed by the silicic acid, thereby liberating sulfuric acid, which, as already stated, acts as an oxidizing agent. The remaining lead oxid combines finally with the gangue of the ore and the non-volatile constituents of the flux (the limestone) to form the required slag. These several reactions commence at the blast-inlet at the bottom of the chamber and extend gradually toward the upper portion of the charge of ore and limestone. Liquefaction of the ores does not take place, for although a slag is formed it is at once solidified by the blowing in of the air, the passages formed thereby in the hardening slag allowing of the continued passage therethrough of the air. The final product is a silicate consisting of lead oxid, lime, silicic acid, and other constituents of the ore, which now contains but little or no sulfur and constitutes a coherent solid mass which when broken into pieces forms a material suitable to be smelted.

The quantity of limestone required for the treatment of the lead ores varies according to the constitution of the ores. It should, however, amount generally to from fifteen to twenty per cent. As lead ores do not contain the necessary amount of limestone as a natural constituent, a considerable amount of limestone must be added to them, and this addition may be made either during the dressing of the ores or subsequently.

For the satisfactory working of my invention the following precautions are to be observed: In order that the blowing in of the air may not cause particles of limestone to escape in the form of dust before the reaction begins, it is necessary to add to the charge before it is subjected to the action in the chamber a considerable amount of water—say five per cent. or more. This water prevents the escape of dust, and it also contributes considerably to the formation of sulfuric acid, which by its oxidizing action promotes the reaction, and consequently, also, the desulfurization. It is advisable in conducting the operation not to fill the chamber with the charge at once, but to first only partly fill it and add to the charge gradually while the chamber is at work, as by this means the reaction will take place more smoothly in the mass.

It is advantageous to proceed as follows: The bottom part of a chamber of any known or suitable form is provided with a grate, on which is laid and ignited a mixture of fuel (coals, coke, or the like) and pieces of limestone. By mixing the fuel with pieces of limestone the heating power of the fuel is reduced and the grate is protected, while at the same time premature melting of the lower part of the charge is prevented, or the grate may be first covered with a layer of limestone and the fuel be laid thereon and then another layer of limestone be placed on the fuel. On the material thus placed in the chamber a uniform charge of lead ore and limestone—say about twelve inches high—is placed, this having been moistened as hereinbefore explained. Under the influence of the air-blast and the heat the reactions hereinbefore described take place. When the upper surface of the first layer becomes red hot, a further charge is laid thereon, and further charges are gradually introduced as the surface of the preceding charge becomes red hot until the chamber is full. So long as charges are still introduced a blast of air of but low pressure is blown through; but when the chamber is filled a larger quantity of air at a higher pressure is blown through. The scorification process then takes place, a very powerful desulfurization having preceded it. During the scorification the desulfurization is completed.

When the process is completed, the chamber is tilted and the desulfurized mass falls out and is broken into small pieces for smelting.

The process can be employed for desulfurizing either lead ores alone or when accompanied by other sulfurous ores, such as those of silver or gold.

The accompanying drawing shows a side view of the apparatus used in connection with the described process.

A is the chamber, properly said, which can be turned on the axle C. At B the inlet-opening for the blast-air is situated.

D is a crank by means of which the chamber is turned when its contents have to be removed.

E is a metal cover which reposes on the chamber A and has for its purpose to collect and lead off the generated gases. In this cover five sight-openings F are arranged. Besides these a further opening G is arranged, through which the material is filled in and which is closed by a door in which one of the sight-openings F is arranged. The dotted lines show the chamber in its emptying position.

I claim—

1. The herein-described process of desulfurizing lead ores which consists in mixing raw ore with limestone and then subjecting the mixture to the simultaneous application of heat and a current of air in sufficient proportions to substantially complete the desulfurization in one operation, substantially as described.

2. The herein-described process of desulfurizing lead ores which process consists in first mixing the ores with limestone, then moistening the mixture, then filling it without previous roasting into a chamber then heating it and treating it by a current of air, as and for the purpose described.

3. The herein-described process of desulfurizing lead ores which consists in mixing raw ores with limestone, then filling the mixture into a chamber, then subjecting the mixture to the simultaneous application of heat and a current of air in sufficient proportions to substantially complete the desulfurization in one operation, the mixture being introduced into the chamber in partial charges introduced successively at intervals during the process, substantially as described.

4. The herein-described process of desulfurizing lead ores which process consists in first mixing the ores with limestone, then moistening the mixture, then filling it without previous roasting into a chamber then heating it and treating it by a current of air, the mixture being introduced into the chamber in partial charges introduced successively at intervals during the process, as and for the purpose described.

5. The herein-described process of desulfurizing lead ores which process consists in first mixing the ores with sufficient limestone to keep the temperature of the mixture below the melting-point of the ore, then filling the mixture into a chamber, then heating said mixture and treating it with a current of air, as and for the purpose described.

6. The herein-described process of desulfurizing lead ores which process consists in first mixing the ores with sufficient limestone to mechanically separate the particles of galena sufficiently to prevent fusion, and to keep the temperature below the melting-point of the ore by the liberation of carbon dioxid, then filling the mixture into a chamber, then heating said mixture and treating it with a current of air, as and for the purpose described.

In testimony whereof I have signed my name to this specification in the presence of two subscribing witnesses.

ADOLF SAVELSBERG.

Witnesses:
   OTTO KÖNIG,
   J. A. RITTERSHAUS.